United States Patent [19]
Mullikin et al.

[11] 3,923,760
[45] Dec. 2, 1975

[54] COLOR IMPROVEMENT PROCESS FOR POLYOLEFINS

[75] Inventors: Richard V. Mullikin, Texas City; Morris R. Ort, Seabrook, both of Tex.

[73] Assignee: Monsanto Company, St. Louis, Mo.

[22] Filed: Dec. 3, 1973

[21] Appl. No.: 421,455

[52] U.S. Cl. ...... 260/88.2 R; 260/88.2 S; 260/93.7; 260/94.9 F; 260/94.9 GD
[51] Int. Cl.² .............................................. C08F 6/00
[58] Field of Search ... 260/94.9 F, 94.9 GD, 88.2 S, 260/88.2 R

[56] References Cited
UNITED STATES PATENTS

| | | | |
|---|---|---|---|
| 3,037,011 | 5/1962 | Leibson et al. | 260/94.9 F |
| 3,075,959 | 1/1963 | Wagener et al. | 260/94.9 F |
| 3,520,866 | 7/1970 | Bacskai | 260/93.7 |
| 3,773,743 | 11/1973 | Ainsworth et al. | 260/94.9 F |

FOREIGN PATENTS OR APPLICATIONS

| | | | |
|---|---|---|---|
| 832,996 | 4/1960 | United Kingdom | 260/94.9 F |
| 987,012 | 3/1965 | United Kingdom | 260/94.9 F |

*Primary Examiner*—Stanford M. Levin
*Attorney, Agent, or Firm*—Elizabeth F. Sporar

[57] ABSTRACT

Polyolefins prepared by polymerization of olefins using Ziegler catalysts in which the transition metal compound is a compound of vanadium are treated in the molten state with a $C_2$–$C_4$ alkanol alone or in combination with a basic compound for decoloration of the polymers.

8 Claims, No Drawings they can be polymerized alone to produce homopolymers or in combination with each other to produce interpolymers or copolymers at relatively low pressures and temperatures by using so-called Ziegler catalysts. Ziegler catalysts may be described broadly as consisting of various combinations of strong reducing agents such as organometallic compounds of an alkali metal, alkaline earth metal, zinc, earth metal or a rare earth metal in combination with various reducible heavy metal compounds such as the halides, alkoxides, acetylacetonates, etc., of the metals of Groups IVB, VB, VIB, VIIB and VIII of the periodic system. Among the preferred types of catalyst for the polymerization reaction are those consisting of a vanadium compound and an organoaluminum compound such as an aluminum alkyl, an alkyl aluminum halide, an alkyl aluminum alkoxide, isoprenyl aluminum and the like, or mixtures of such compounds. With these catalysts, very small amounts of the vanadium compound are employed to provide high yields of polymer per unit of catalyst and the polymer is usually processed after recovery from the reaction mixture by simple separation techniques such as filtration, centrifuging, evaporation or purging without a separate catalyst removal step or extraction being required. The color of such products, however, varies with the yield since the catalyst residues remain in the polymer. At a vanadium content of less than three parts per million parts of polymer, the polymer is colorless and no color problems are presented. When the vanadium content exceeds 3 ppm and is in the range, for example, from about 3 ppm to about 25 ppm, polymer color is unsatisfactory and the product does not meet the usual commercial specifications. Accordingly, a method for decolorization of such polymers is needed.

COLOR IMPROVEMENT PROCESS FOR POLYOLEFINS

BACKGROUND OF THE INVENTION

The present invention relates to a method of treating polyolefins so as to improve the color thereof. More particularly, it relates to such treatment of polyolefins prepared by polymerization using Ziegler catalysts in which the transition metal compound is a compound of vanadium.

It has been well known for some time now that ethylene and other olefins can be polymerized alone to produce homopolymers or in combination with each other to produce interpolymers or copolymers at relatively low pressures and temperatures by using so-called Ziegler catalysts. Ziegler catalysts may be described broadly as consisting of various combinations of strong reducing agents such as organometallic compounds of an alkali metal, alkaline earth metal, zinc, earth metal or a rare earth metal in combination with various reducible heavy metal compounds such as the halides, alkoxides, acetylacetonates, etc., of the metals of Groups IVB, VB, VIB, VIIB and VIII of the periodic system. Among the preferred types of catalyst for the polymerization reaction are those consisting of a vanadium compound and an organoaluminum compound such as an aluminum alkyl, an alkyl aluminum halide, an alkyl aluminum alkoxide, isoprenyl aluminum and the like, or mixtures of such compounds. With these catalysts, very small amounts of the vanadium compound are employed to provide high yields of polymer per unit of catalyst and the polymer is usually processed after recovery from the reaction mixture by simple separation techniques such as filtration, centrifuging, evaporation or purging without a separate catalyst removal step or extraction being required. The color of such products, however, varies with the yield since the catalyst residues remain in the polymer. At a vanadium content of less than three parts per million parts of polymer, the polymer is colorless and no color problems are presented. When the vanadium content exceeds 3 ppm and is in the range, for example, from about 3 ppm to about 25 ppm, polymer color is unsatisfactory and the product does not meet the usual commercial specifications. Accordingly, a method for decolorization of such polymers is needed.

SUMMARY OF THE INVENTION

According to the present invention, undesirable color in an olefin polymer produced by polymerizing an alpha-olefin either alone or in combination with other olefins in contact with a Ziegler-type catalyst comprising a vanadium compound and an organoaluminum compound is eliminated by intimately contacting said polymer while it is in the molten state with an alkanol having from 2 to 4 carbon atoms and thereafter removing substantially all of said alkanol as a vapor from said polymer. In the preferred embodiment of the invention, a basic compound of a metal of Groups I or II of the periodic system is added to the polymer with the alcohol treating agent.

DESCRIPTION OF THE PREFERRED EMBODIMENTS

The contacting of the alcohol treating agent and the colored polymer can be effected in any convenient manner so long as the polymer is maintained in the molten state during treatment. Temperature is not a critical factor and may vary from about 120° to about 315°C. Contact times form a minimum of about one minute to about 10 minutes are generally suitable with contact times from about 1.5 to about 5 minutes being preferred. As would be expected, the longer contact times would be employed at the lower temperatures while at higher temperatures, shorter contact times could be used. In the preferred method of operation, the alcohol is added to the polymer just prior to the passage of the latter through a vented extruder. An extruder is advantageous because it provides good contact between the molten polymer and the alkanol vapor. The alcohol treating agent is substantially removed during the passage through the extruder to the point that upon re-extrusion no voids or foaming occur and no residual odor of alcohol is detectable in the polymer. With other methods of mixing or extrusion, various techniques for removal of last traces of alcohol such as purging of the polymer product in an oven, for example, can be employed.

Suitable alcohols for practice of the invention include ethanol, n-propanol, isopropanol, n-butanol, isobutanol, sec-butanol and tert-butanol. Preferably, either isopropanol or ethanol is the decolorizing agent employed. The amount of alcohol to be employed depends upon the vanadium content of the polymer. Generally, an amount from about 0.05 to about 5.0 per cent by weight of the polymer is employed. Preferably, the amount of the alcohol employed is from about 0.1 to about 2 per cent by weight of the polymer.

Color improvement in the polymer is increased significantly if a basic compound is added along with the alkanol treating agent. Suitable basic compounds are those of the metals of Groups I and II of the Periodic Table such as the oxides, hydroxides, carbonates, etc., of these metals. Particular compounds which can be used include sodium hydroxide, potassium hydroxide, calcium hydroxide, calcium oxide, zinc oxide, calcium carbonate, magnesium hydroxide, magnesium carbonate and the like. Particularly preferred are the weak bases, i.e., the compounds of the metals of Groups II, because polymer which has been treated with these compounds exhibits greater stability during subsequent high temperature processing than polymer treated with the stronger bases. The use of these weak base compounds alone provides some improvement in color. But the use of a weak base with the alcohol enhances the effect on color improvement. Amounts of such compounds in the range from about 10 to about 500 parts by weight per million parts by weight of the polymer are usually employed. Preferably, the basic material is added in an amount from about 25 to about 200 ppm in the polymer. In the preferred embodiment of the invention, either zinc oxide or calcium hydroxide is employed with isopropanol or ethanol.

The process of the invention is applicable to the treatment of polymer made either by gas phase or by slurry phase polymerization using either supported or unsupported catalysts. It is equally applicable for treatment of polyolefins per se such as polyethylene, polypropylene, polybutene, polypentene, and the like or of copolymers of such olefins such as ethylene-propylene, ethylene-butene, ethylene-hexene, and the like copolymers.

The decolorizing treatment of the crude polymer may be conducted as a separate step but it is more advantageously effected during the usual steps of converting polymer powder to pellets when various additives such as stabilizers, anti-oxidants, anti-slip agents, antistatic agents and the like are incorporated in the polymer. These additives do not appear to affect the decolorization in any way although the measured color of the polymer is sometimes not as good when such additives are present as it is in their absence. The slight difference in color is believed to be attributable to the off-white or yellowish color of some additives and/or their oxidation products rather than to their interference with the decolorizing reaction.

The decolorizing treatment may be applied to polymer initially in the dry state or to polymer wet with a polymerization solvent. The treatment may be effected prior to, during or after exposure of the polymer to air.

The invention is illustrated in the following examples which are not to be construed as limiting it in any particular manner. All parts given are parts by weight unless otherwise specified.

EXAMPLE 1

Polyethylene was prepared by polymerizing ethylene in the gas phase at a temperature of 106°C and a pressure of 500 psig using a catalyst consisting of ethylaluminum diethoxide, vanadium oxytrichloride and triethylaluminum supported on silica gel which had been reacted with triethylaluminum prior to deposition of the catalyst. The crude polymer product containing approximately 18 ppm vanadium was densified in a 1-in. Killion extruder at a temperature of approximately 150°C so that the polymer was in the molten state and treated during the densification with various amounts of isopropanol alone and with isopropanol in combination with varying amounts of potassium hydroxide. Potassium hydroxide in isopropanol was added as a liquid at room temperature by blending the polyethylene powder and the isopropanol solution prior to extrusion. The treated polymer products were dried to remove all traces of alcohol and then analyzed for color using compression molded test pieces prepared from them at 250°C and a maximum pressure of 20 tons per square inch. The color of the pieces (0.125 in. thickness) was determined by standard spectrophotometric means which measures degree of yellowness. Reflectance (R) of the test pieces at wavelengths of 700 nanometers(nm), 500 nm and 433 nm was measured and a numerical value, $Y_3$, calculated according to the formula $$Y_3 = 2R_{700} - (R_{500} + R_{433})$$

was obtained to provide for comparative evaluation. The lower the numerical value obtained, the "whiter" or less yellowish is the polymer. A greyness value, i.e., the reflectance measured at a wavelength of 560 nm, was also obtained for each test piece. In this case, the higher values signify "whiter" or less colored polymer.

In some instances, the polymer was stabilized prior to color evaluation by the addition of stabilizers or anti-oxidants. Results of the color evaluations obtained together with the treating agents to which the various polymers were subjected are presented in Table 1. The color evaluation of the untreated polymer is included for comparative purposes.

TABLE 1

| Treating Agent(s) | $Y_3$ | % Greyness |
|---|---|---|
| None | +29 | 76 |
| 0.8% Isopropanol | +0.3 | 87 |
| 1.6% " | −1.4 | 89 |
| 0.8% Isopropanol, 75 ppm KOH | −3.6 | 90 |
| 0.8% Isopropanol, 150 ppm KOH | −3.6 | 90 |

EXAMPLE 2

Another sample of polyethylene was prepared by polymerizing ethylene in the gas phase at a temperature of ~ 105°C and a pressure of 200 psig using a catalyst consisting essentially of dodecyloxyvanadium oxydichloride and triethylaluminum supported on silica gel. A portion of the crude polymer product containing about 24 ppm vanadium was extruded as in Example 1 with ethanol, 0.05 wt. % of Voidox* also being incorporated into the polymer during extrusion. Color evaluation of this treated sample and a sample of the polymer product containing only 0.05 wt. % of Voidox gave the results shown in Table 2.

*Voidox - an antioxidant which is a mixture of glycerol monostearate and 2,6-ditert-butyl-4 methylphenol

TABLE 2

| Sample | Wt. % Ethanol | $Y_3$ | % Greyness |
|---|---|---|---|
| 1 | none | +27 | 63 |
| 2 | 1.6 | + 5 | 86 |

EXAMPLE 3

Additional samples of polyethylene were prepared by gasphase polymerization of ethylene using the same catalyst employed in Example 1 and essentially the same polymerization conditions. Portions of the polymer products containing approximately 20 to 25 ppm of vanadium were treated while in the molten state as described in Example 1 with isopropanol alone and with isopropanol and a weak base. In some instances, an anti-oxidant or stabilizer was incorporated simultaneously with the alcohol treatment. Color evaluations of the untreated and treated products were made as described in Example 1 and the results are presented in Table 3.

TABLE 3

| Sample | Treating Agent(s) | $Y_3$ | % Greyness |
|---|---|---|---|
| 1 | None | +14.5 | 84 |
| 1 | 0.8% Isopropanol | +3.2 | 90 |
| 1 | 100 ppm Ca(OH)$_2$ | +8.0 | 85 |
| 1 | 0.8% Isopropanol, 100 ppm Ca(OH)$_2$ | +1.0 | 89 |
| 2 | 0.8% Isopropanol, 100 ppm Ca(OH)$_2$ | +3.3 | 87 |
| 2 | 0.8% Isopropanol, 100 ppm CaO | +6.9 | 84 |
| 2 | 0.8% Isopropanol, 100 ppm CaCO$_3$ | +1.9 | 88 |
| 2 | 0.8% Isopropanol, 100 ppm ZnO | +0.8 | 88 |
| 3 | None | +32.0 | 69 |
| 3 | 0.8% Isopropanol | +8.7 | 83 |
| 3 | 0.8% Isopropanol, 100 ppm Ca(OH)$_2$ | +5.4 | 84 |
| 3 | 0.8% Isopropanol, 50 ppm Ca(OH)$_2$ | +5.8 | 84 |
| 3 | 0.8% Isopropanol, 25 ppm Ca(OH)$_2$ | +6.5 | 83 |
| 3 | 0.8% Isopropanol, 100 ppm Mg(OH)$_2$ | +5.3 | 85 |

TABLE 3-continued

| Sample | Treating Agent(s) | $Y_3$ | % Greyness |
|---|---|---|---|
| 3 | 0.8% Isopropanol, 100 ppm Ca(OH)$_2$, 300 ppm Voidox | +7.2 | 82 |
| 3 | 0.8% Isopropanol, 100 ppm Ca(OH)$_2$, 300 ppm Goodrite-3114 * | +4.6 | 85 |

* Goodrite-3114 — a commercial anti-oxidant reported to be tris(3,5-di-t-butyl-4-hydroxybenzyl) isocyanurate

EXAMPLE 4

Ethylene was polymerized in hexane as a reaction medium at a temperature of 80°C and a pressure of 80 psig using as catalyst a mixture of vanadium oxytrichloride, dodecyl alcohol and triethylaluminum having an Al/V ratio of 3.0. The polymer was recovered at the completion of the polymerization reaction after filtration from the reaction mixture and vacuum dried at 80°C. Samples of the crude polymer containing approximately 25 ppm of vanadium were extruded as described in the preceding examples at a temperature of 150°C and during extrusion were treated with a butanol. Color evaluation of the treated and untreated polymer were made as described in the previous examples with the results reported in Table 4 below.

TABLE 4

| Treating Agent | $Y_3$ | % Greyness |
|---|---|---|
| None | 3.4 | 85.6 |
| 1.2% Sec-butanol | 1.2 | 87.2 |
| 1.2% Tert-butanol | 1.8 | 86.6 |

EXAMPLE 5

Copolymers of ethylene and propylene were prepared by polymerizing in the gas phase a mixture of ethylene and approximately 2.5 ± 0.5 mole % propylene in contact with a catalyst comprising vanadium oxytrichloride, ethylaluminum diethoxide and triethylaluminum (molar ratio 1:6:4) supported on silica gel which had been reacted with triethylaluminum prior to deposition of the catalyst thereon. Polymerization was conducted at a temperature of 103°–104°C and a pressure of 500 psig. Samples of the copolymers containing 15 and 7 ppm, respectively, of vanadium were treated during densification while in the molten state as described in the previous examples with isopropanol and calcium hydroxide, an antioxidant also being added during the passage of the polymer through the extruder. Evaluation for color of the treated and untreated copolymer samples as described in the foregoing examples gave the following results.

| Treating Agent | Sample 1 $Y_3$ | Sample 1 % Greyness | Sample 2 $Y_3$ | Sample 2 % Greyness |
|---|---|---|---|---|
| None | +8.8 | 76.8 | 2.1 | 80.7 |
| 0.8% Isopropanol, 100 ppm Ca(OH)$_2$, 500 ppm Voidox | −0.3 | 81.6 | −8.4 | 83.8 |

It is readily apparent from the data presented in the foregoing examples that when either homopolymers or copolymers of ethylene with unsatisfactory color are treated according to the method of the invention, a significant improvement in total color (increased % greyness) of the polymers is effected. This improvement is accompanied by a reduction in yellowness (lower $Y_3$ values) and in many instances the treatment results in polymers having a very desirable blue-white cast (negative $Y_3$ values). Further, it can be seen that the presence of antioxidants in the polymer does not materially affect these results.

What is claimed is:

1. The method of improving the color of an olefin polymer or copolymer having a vanadium content from about 3 to about 25 parts per million parts by weight of polymer and prepared by polymerization of an alpha-olefin alone or in combination with other olefins in contact with a Ziegler catalyst comprising a vanadium compound which consists of intimately contacting said polymer in the molten state with an alkanol having 2 to 4 carbon atoms in an amount from about 0.05 to about 5.0% by weight of the polymer and from about 10 to about 500 parts by weight per million parts by weight based on the polymer of a weak base selected from the group consisting of the oxides, hydroxides and carbonates of metals of Group II of the Periodic Table and thereafter removing all of said alkanol as a vapor from said polymer.

2. The method of claim 1 wherein said olefin polymer is polyethylene.

3. The method of claim 1 wherein said olefin polymer is a copolymer of ethylene and propylene.

4. The method of claim 2 wherein said weak base is zinc oxide.

5. The method of claim 2 wherein said weak base is calcium hydroxide.

6. The method of claim 4 wherein said alkanol is isopropanol.

7. The method of claim 5 wherein said intimate contacting is effected in a vented extruder during densification of the polymer and incorporation of stabilizing additives therein.

8. The method of claim 2 wherein said alkanol is isopropanol.

* * * * *